US005136408A

United States Patent [19]

Okada et al.

[11] Patent Number: 5,136,408

[45] Date of Patent: Aug. 4, 1992

[54] LIQUID CRYSTAL APPARATUS AND DRIVING METHOD THEREFOR

[75] Inventors: Shinjiro Okada, Hiratsuka; Yutaka Inaba, Kawaguchi, both of Japan

[73] Assignee: Canon Kabushiki Kaisha, Tokyo, Japan

[21] Appl. No.: 774,647

[22] Filed: Oct. 15, 1991

Related U.S. Application Data

[63] Continuation of Ser. No. 668,691, Mar. 7, 1991, which is a continuation of Ser. No. 356,868, May 25, 1989.

[30] Foreign Application Priority Data

Jun. 1, 1988 [JP] Japan ................................ 63-135907

[51] Int. Cl.[5] ................................................ G02F 1/13

[52] U.S. Cl. ...................................... 359/56; 359/104; 340/805

[58] Field of Search ........................ 350/332, 333, 3505; 340/784, 805; 359/54, 56, 104

[56] References Cited

U.S. PATENT DOCUMENTS 4,413,256 11/1983 Yasuda et al. ...................... 350/333
4,844,590 7/1989 Okada et al. ......................... 350/333
4,904,064 2/1990 Lagerwall et al. ................. 350/333
4,932,759 6/1990 Toyono et al. ...................... 350/333

FOREIGN PATENT DOCUMENTS 0244804 11/1987 European Pat. Off. .

*Primary Examiner*—Rolf Hille
*Assistant Examiner*—Tan Ho
*Attorney, Agent, or Firm*—Fitzpatrick, Cella, Harper & Scinto

[57] ABSTRACT

A liquid crystal apparatus, includes a liquid crystal device comprising a matrix electrode structure including scanning electrodes and data electrodes intersecting each other and forming a pixel at each intersection, and a ferroelectric liquid crystal having a negative dielectric anisotropy disposed between the scanning electrodes and the data electrodes; and means for applying to a pixel on a selected scanning electrode a bipolar pulse for causing a conversion of one optical state to the optical state of the pixel, the bipolar data pulse including a unit pulse of one polarity which has a duration set to be shorter than a minimum value $\tau_{min}$ of a current response time $\tau_0$.

20 Claims, 11 Drawing Sheets

FIG. 5a
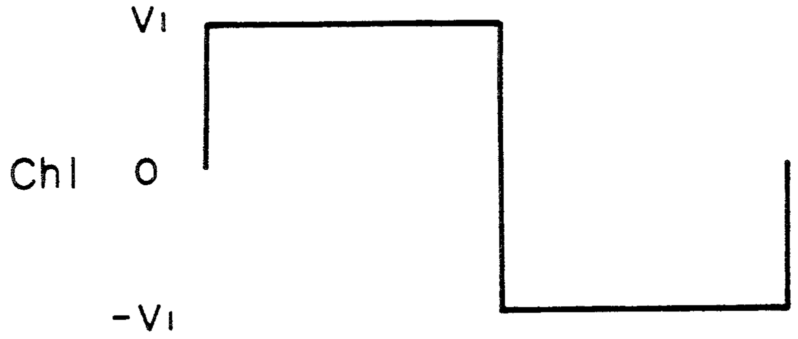
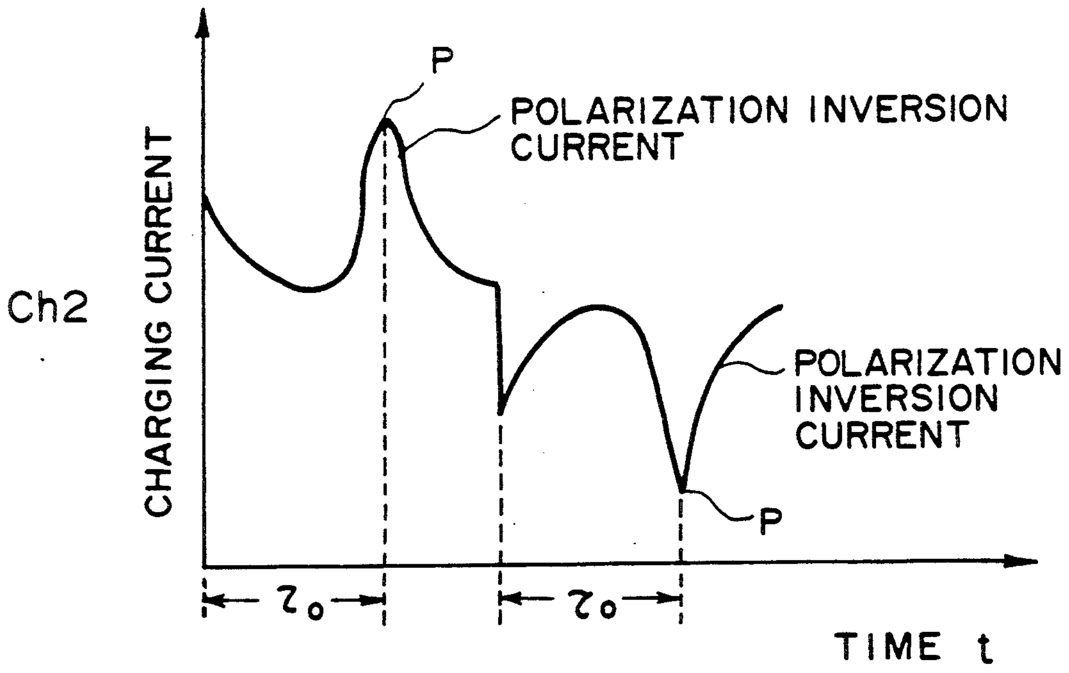
FIG. 5b

LIQUID CRYSTAL APPARATUS AND DRIVING METHOD THEREFOR

This application is a continuation of application Ser. No. 07/668,691 filed Mar. 7, 1991, now abandoned, which was a continuation of application Ser. No. 07/356,868 filed May 25, 1989, also now abandoned.

FIELD OF THE INVENTION AND RELATED ART

The present invention relates to a liquid crystal apparatus, more particularly a liquid crystal apparatus using a ferroelectric liquid ciystal (hereinafter sometimes abbreviated as "FLC").

Clark and Lagerwall have disclosed a bistable ferroelectric liquid crystal device using a surfacestabilized ferroelectric liquid crystal in Applied Physic Letters, Vol. 36, No. 11 (Jun. 1, 1980), pp. 899 -901, and U.S. Pat. Nos. 4,367,924 and 4,563,059. Such a bistable ferroelectric liquid crystal device has been realized by placing a ferroelectric chiral smectic liquid crystal between a pair of substrates disposed with a gap therebetween sufficiently small to suppress the formation of a helical alignment structure of liquid crystal molecules which is inherent in the bulky chiral smectic phase of the liquid crystal and by aligning vertical smectic molecular layers each composed of a plurality of liquid crystal molecules in one direction.

In such a ferroelectric liquid crystal device, there are restrictively formed two stable average longer-molecular axis directions (n) with a molecular dipole moment ($\hat{n}$) parallel to the vertical molecular layer so as to form a spontaneous polarization (Ps) on the average. The spontaneous polarization causes a strong coupling with an applied electric field. When such a ferroelectric liquid crystal is placed in an electric field in one direction, the dipole moments ($\hat{n}$), in a vertical molecular layer are oriented in the electric field direction. At this time, a maximum tilt angle is attained corresponding to one half of the apex angle of a helical cone in the helical alignment structure. (The molecular alignment state at this time may be referred to as "uniform alignment state $U_1$"). When the above-mentioned electric field is removed, the molecules are realigned into another stable alignment state (referred to as "splay alignment state $S_1$") which has a lower degree of order, a lower degree of optically uniaxial characteristic and a lower tilt angle than the uniform alignment state $U_1$ after some relaxation period (which is generally on the order of 1 -2 μsec while dependent on the kind of a ferroelectric liquid crystal used). In the splay alignment state $S_1$, the dipole moments of the molecules are not in a single direction but the direction of the spontaneous polarization is the same as in the uniform alignment state $U_1$. Further, by application of an electric field in the reverse direction, there are similarly formed a uniform alignment state $U_2$ and a splay alignment state $S_2$.

Accordingly, in case where the above-mentioned ferroelectric liquid crystal device is used as a display panel, the brightness or contrast of the panel is basically governed by the transmittances in the splay alignment states $S_1$ and $S_2$. More specifically, a transmitted light intensity I through a liquid crystal is given by the following equation with respect to the incident light intensity $I_0$ under cross nicols when the uniaxial alignment of the molecules is assumed:

$$I = I_0 \sin^2(4\theta a)\cdot\sin^2(\pi\Delta nd/\lambda),$$

wherein $\theta$a denotes a tile angle: Δn, the refractive index anisotropy of the FLC; d, the cell thickness, and λ, the wavelength of the incident light. According to our experiments, the tilt angle $\theta$a in the splay alignment states $S_1$ and $S_2$ is generally about 5-8 degrees which is too small for providing a sufficient contrast.

With respect to such a problem, a liquid crystal apparatus having a high-frequency AC application means (for utilizing an AC stabilization effect of providing an increased tilt angle) has been disclosed, e.g., by Japanese Laid-Open Patent Applications (KOKAI) Nos. 246722/1986, 246723/1986, 246724/1986, 249024/1986 and 249025/1986. Such an apparatus uses a means for applying a high frequency AC in addition to means for applying switching pulses for driving, so that there arises a problem of a large power consumption.

The AC stabilization effect is governed by the correlation between a torque acting on a molecule due to the spontaneous polarization Ps and a torque acting on the molecule due to the dielectric anisotropy ΔE. In case of multiplex matrix drive of a ferroelectric liquid crystal device, a broad margin or latitude for a voltage range or frequency range affording a practical drive is desired. However, such a driving margin becomes remarkably narrower in a multiplex drive under such an AC-stabilized condition than in a driving system not utilizing the AC stabilization effect.

SUMMARY OF THE INVENTION

An object of the present invention is to provide a liquid crystal apparatus capable of applying an AC voltage for providing an increased tilt angle to ferroelectric liquid crystal pixels without superposing such an AC voltage or causing a decrease in driving voltage margin.

According to the present invention, there is provided a liquid crystal apparatus, comprising:

a liquid crystal device comprising a matrix electrode structure including scanning electrodes and data electrodes intersecting each other and forming a pixel at each intersection, and a ferroelectric liquid crystal having a negative dielectric anisotropy disposed between the scanning electrodes and the data electrodes; and means for applying to a pixel on a selected scanning electrode a bipolar pulse for causing a conversion of one optical state to the other optical state of the pixel, the bipolar data pulse including a unit pulse of one polarity which has a duration set to be shorter than a minimum value $\tau_{min}$ of a current response time $\tau_0$.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 5a and 5b illustrate a correlation between an oscillogram Ch 1 representing an input pulse waveform and an oscillogram Ch 2 representing a current response including a polarization inversion current;

DETAILED DESCRIPTION OF THE INVENTION

A torque $\Gamma_{Ps}$ acting an FLC molecules due to coupling of an applied electric field (E) and the dipole moment and a torque $\Gamma\Delta\epsilon$ acting on FLC molecules due to coupling of the applied electric field (E) and a dielectric anisotropy ($\Delta\epsilon$) are respectively represented by the following formulas:

$$\Gamma_{Ps} \propto Ps \cdot E \quad (1)$$

$$\Gamma\Delta\epsilon \propto \tfrac{1}{2} \cdot \Delta\epsilon \cdot \epsilon_0 \cdot E^2 \quad (2)$$

From the above formula (2), it is understood that a larger dielectric anisotropy $\Delta\epsilon$ promotes the suppression or removal of the helical alignment structure. Further, in case of $\Delta\epsilon<0$, liquid crystal molecules are forced under an applied electric field to align so as to provide a predominant proportion of projection component on the substrate, whereby the helical alignment structure is suppressed.

Figure 1:
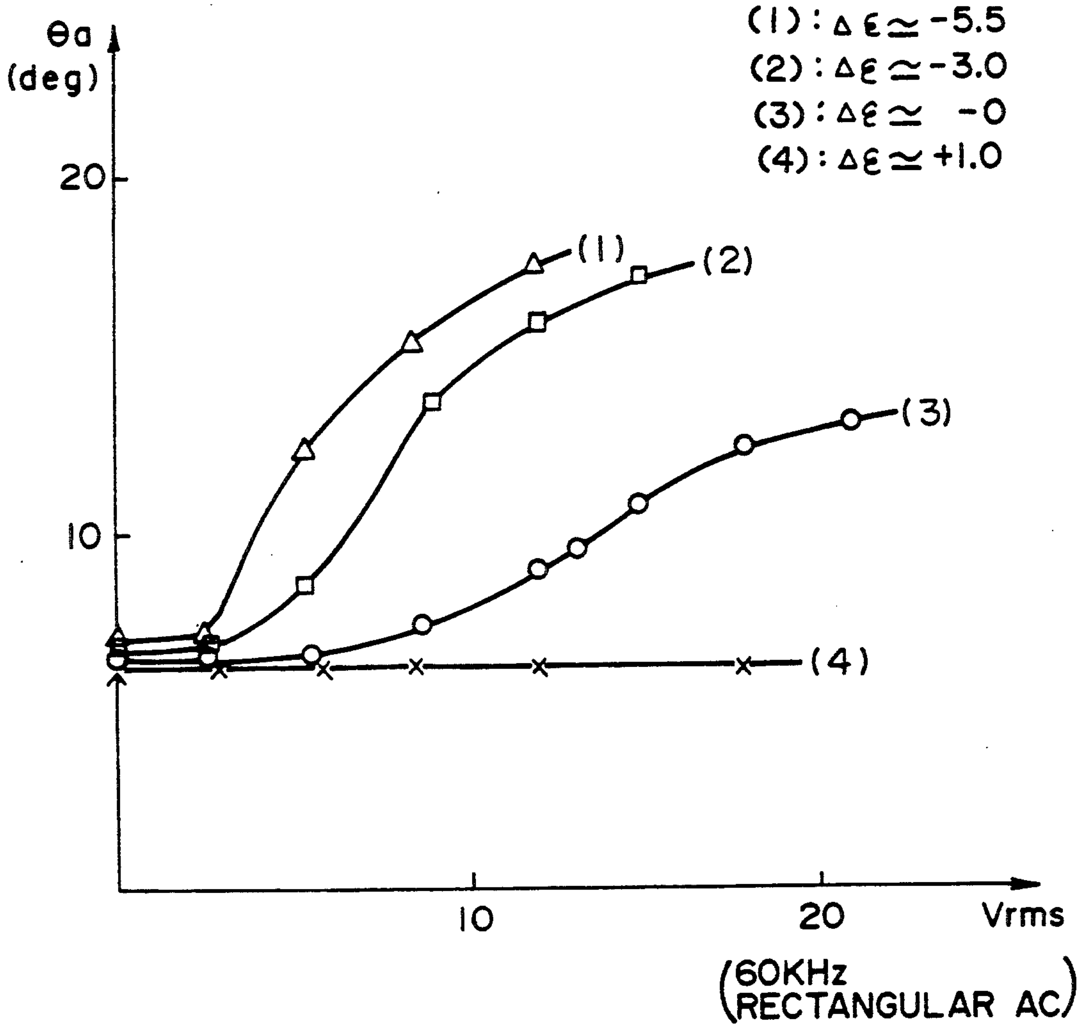
FIG. 1 is a graph showing changes in tilt angle $\theta$a versus effective voltage Vrms with respect to several ferroelectric liquid crystals having different values of dielectric anisotropy ΔE.

FIG. 1 attached hereto shows the change of tilt angles $\theta a$ versus Vrms experimentally measured for 4 FLCs having different values of $\Delta\epsilon$. The measurement was conducted under application of AC rectangular pulses of 60 KHz so as to remove the influence of Ps. The curves (1)-(4) correspond to the results obtained by using FLCs showing the following $\Delta\epsilon$ values $\Delta\epsilon \simeq -5.5,$ (1)
$\Delta\epsilon \simeq -3.0,$ (2)
$\Delta\epsilon \simeq -0,$ (3)
$\Delta\epsilon \simeq 1.0.$ (4)

As is clear from the graph is FIG. 1, a large negative value of $\Delta\epsilon$ provides a larger $\theta a$ at a lower voltage and thus contributes to provision of an increased I.

The maximum transmittances obtained by using the liquid crystals (1) and (3) were 15% for (1) and 6% for (3) (under cross nicols and application of rectangular AC waveforms of 60 KHz and $\pm 8$ V), thus showing a clear difference.

Figures 2A, 2B, 2C, 2D, 2E:
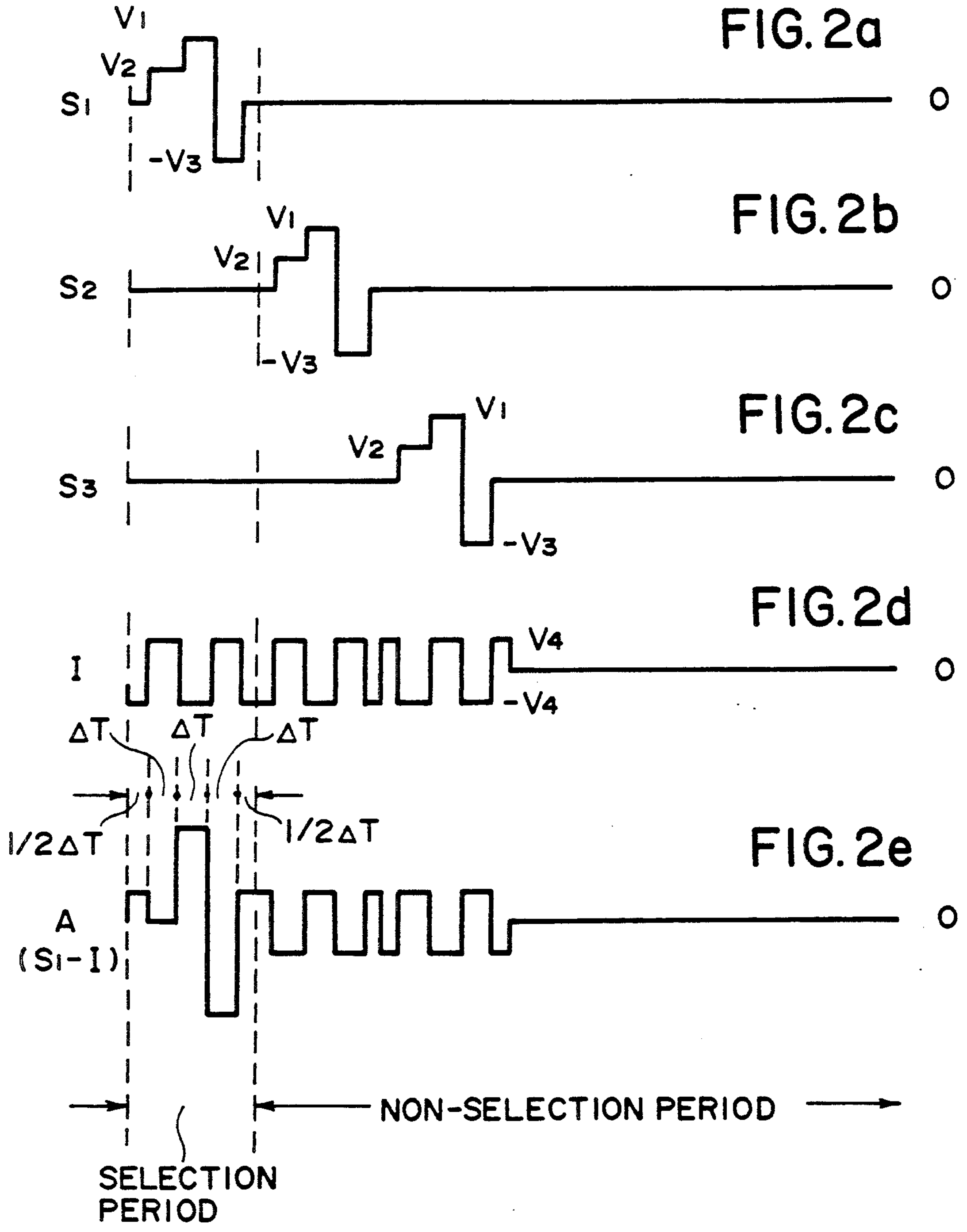
FIGS. 2a-2e, 3a-3e, and 4a-4e are driving waveform diagrams used in embodiments of the present invention.
Figures 3A, 3B, 3C, 3D, 3E:
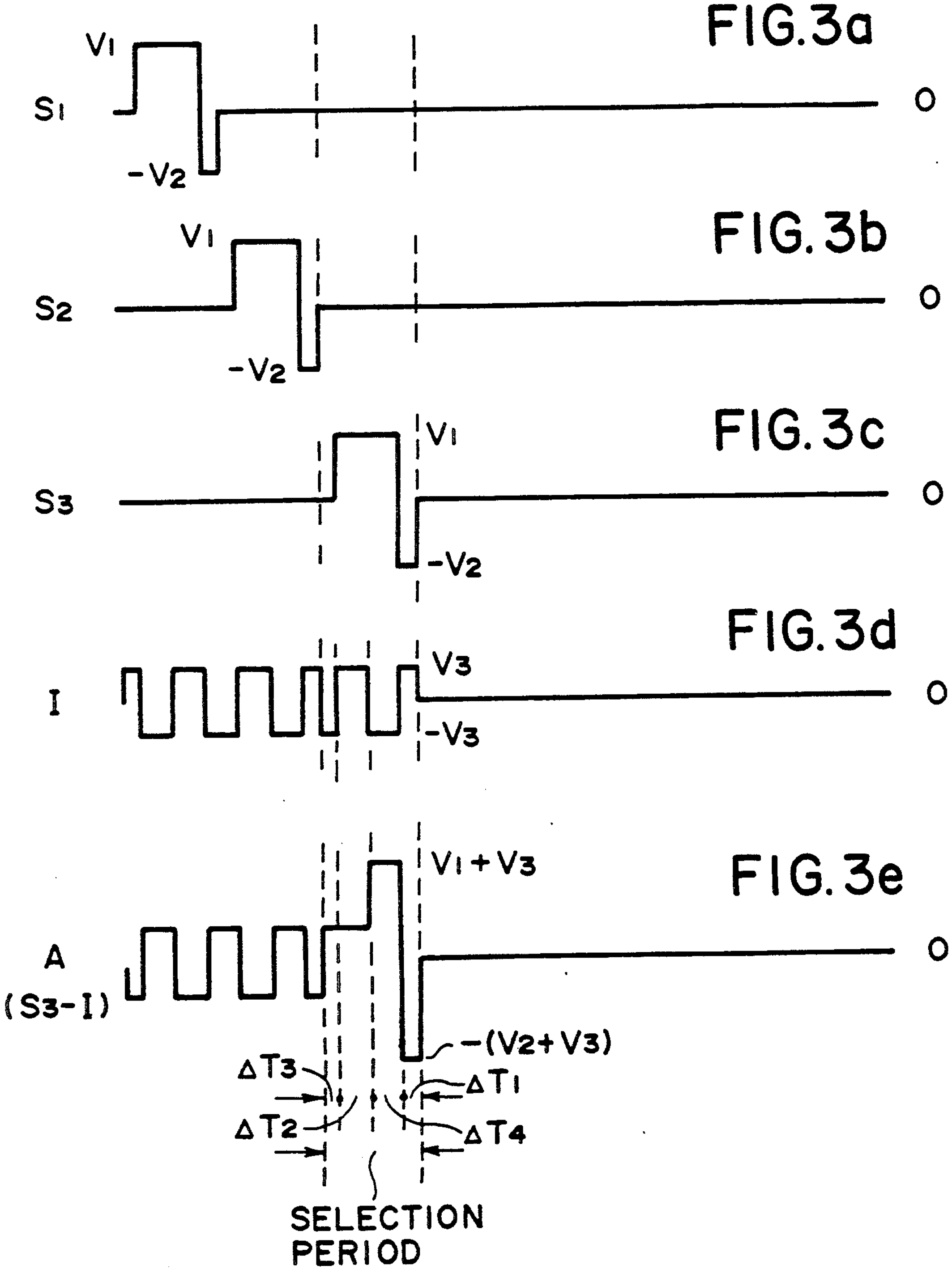
Figure 4A:
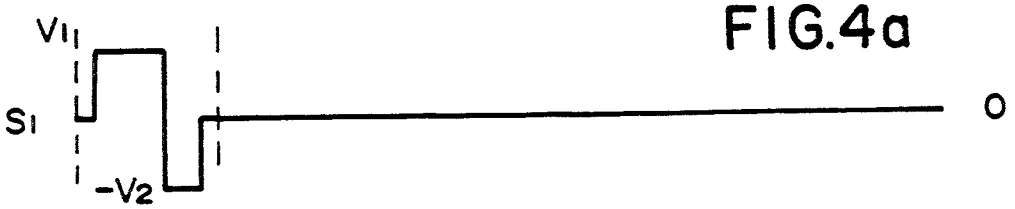
Figure 4B:
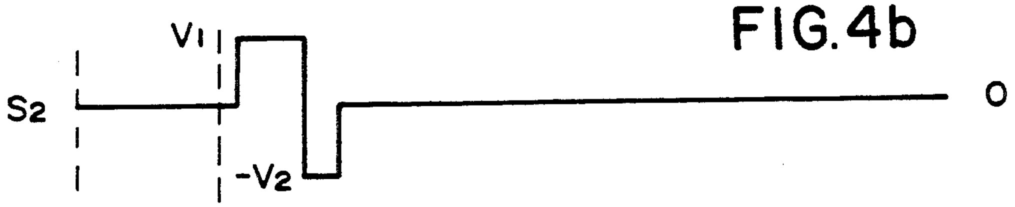
Figure 4C:
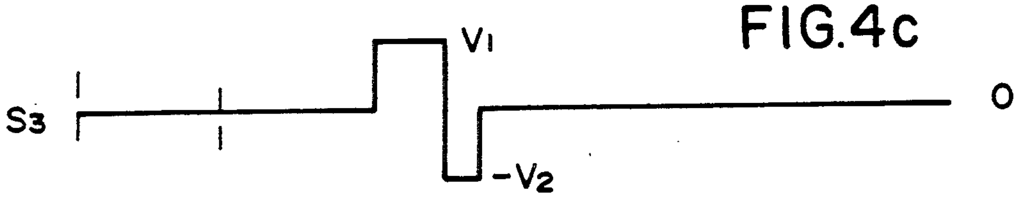
Figure 4D:
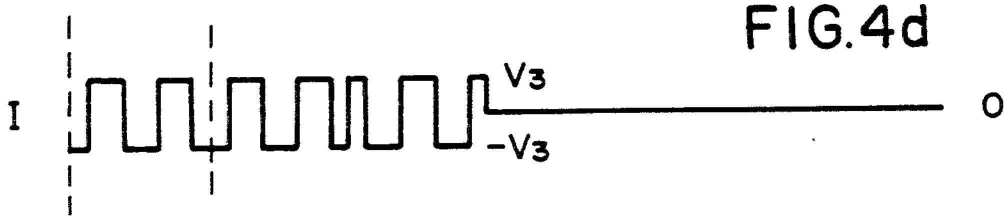
Figure 4E:
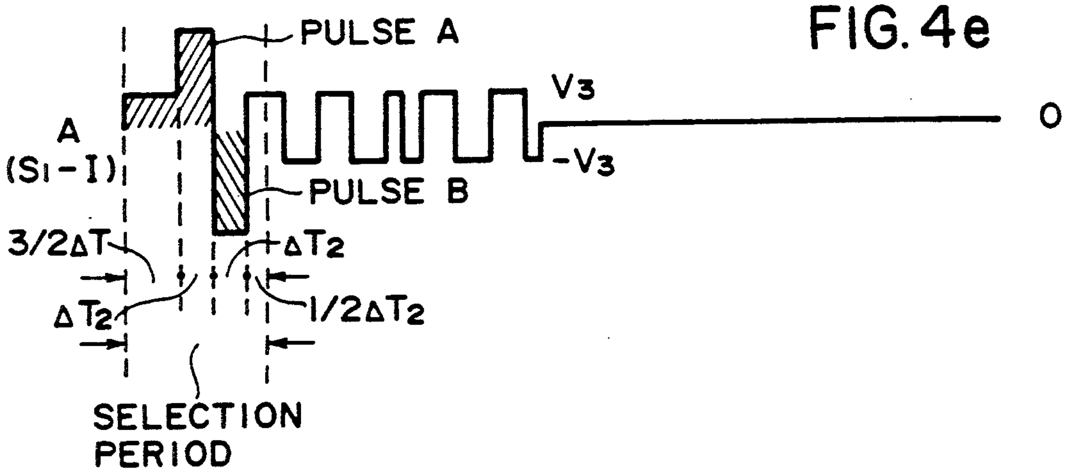

FIGS. 2-4 respectively illustrate a driving waveform embodiment. In the figures, at $S_1$, $S_2$ and $S_3$ are shown scanning signals, and at I are shown data signals. Further, at A ($S_1$- I) is shown a combined voltage waveform applied to a pixel at the intersection of a scanning line $S_1$ and a data line I in a selection period and a non-selection period.

The ferroelectric liquid crystal used in the present invention may preferably be a chiral smectic liquid crystal having a negative dielectric anisotropy $\Delta\epsilon$. There is known, for example, "CS-1011" (trade name, available from Chisso K.K.) as a commercially available material. The ferroelectric liquid crystal may preferably have a dielectric anisotropy $\Delta\epsilon$ of $-1.0$ or below. The ferroelectric liquid crystal may preferably be disposed in a layer thin enough to suppress the formation of a helical molecular alignment structure inherent to bulk chiral smectic phase in the absence of an electric field, e.g., in a thickness of 0.5 to 10 microns, more preferably 1.0-5.0 microns. The ferroelectric liquid crystal layer may preferably be disposed in contact with an alignment control film comprising, e.g., a polyimide film, polyamide film, polyamide-imide film, polyester-imide film or polyvinyl alcohol film subjected to a rubbing treatment, or an SiO or $SiO_2$ film formed by oblique vapor deposition, so that a monodomain may be effectively formed.

Figure 6:
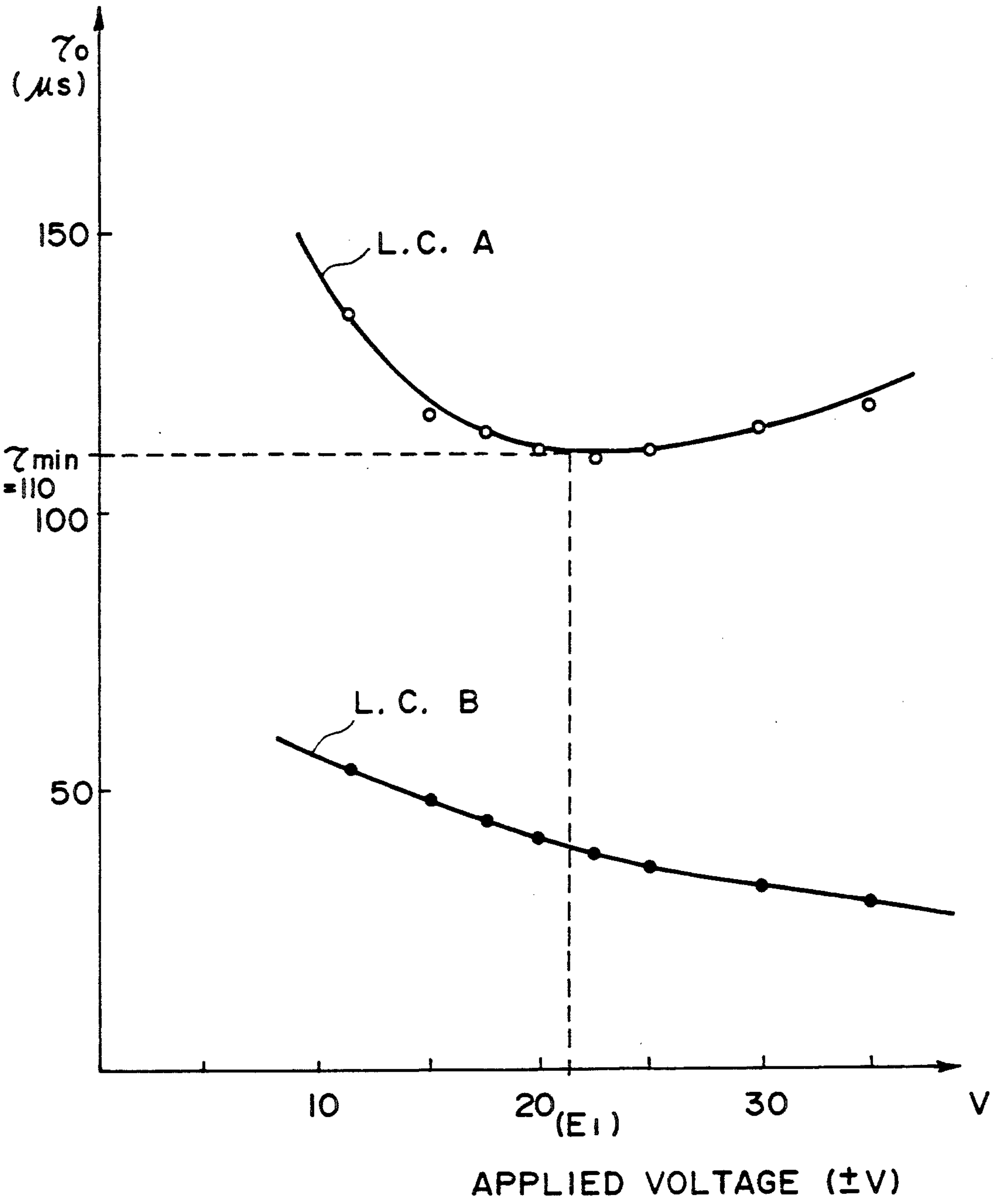
FIG. 6 is a characteristic diagram illustrating a correlation between an applied voltage pulse height and a current response time $\tau_0$ (time from the rising of the voltage pulse until the peak of a polarization inversion current caused by the voltage pulse application) including a minimum value $\tau_{min}$ given under application of varying pulse heights of the applied pulse voltage.

The ferroelectric liquid crystal used in the present invention may cause a polarization inversion current when supplied with a voltage pulse as shown in FIG. 5. A time from an instant of a pulse rise to an instant giving a peak P of the polarization inversion current may be referred to as a current response time $\tau_0$. The current response time $\tau_0$ depends on the applied voltage (pulse waveheight). FIG. 6 shows the dependence of the current response time $\tau_0$ on the applied voltage V with respect to two types of liquid crystals, i.e., liquid crystal A and liquid crystal B which will be described hereinafter. As shown in FIG. 6, the liquid crystal A provided a minimum value $\tau_{min} \approx 110$ μsec of the current response time $\tau_0$ in the neighborhood of an applied voltage of 20 volts (providing an electric field intensity $E_1$ for a cell gap of 1.5 micron), while the liquid crystal B provided no minimum value $\tau_{min}$.

Figure 7:
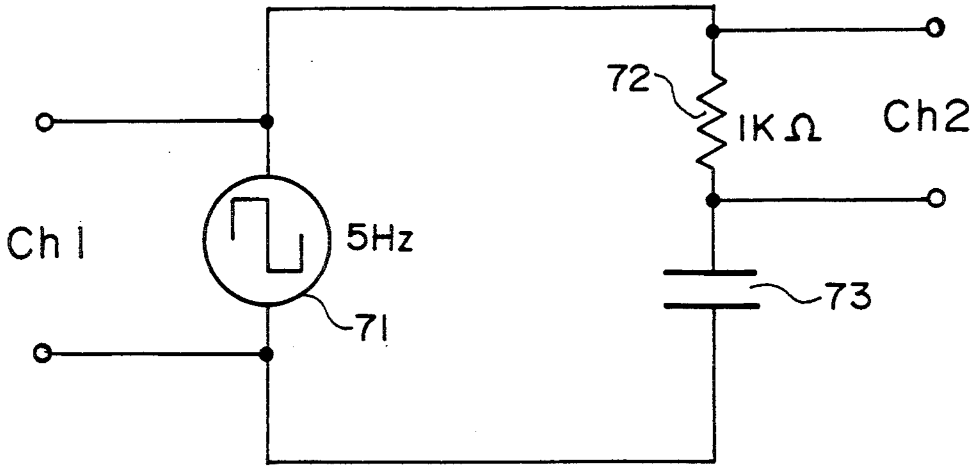
FIG. 7 is a circuit diagram for a polarization inversion current meter.

The above-mentioned current response time $\tau_0$ may be measured by means of a current response time meter as shown in FIG. 7. The meter includes a pulse generator 71 for generating a pulse of 5 Hz, a resistor 72 of 1 KΩ, a ferroelectric liquid crystal cell 73, an oscillograph Ch 1 providing an oscillogram as shown at Ch 1 in FIG. 5 and also an oscillograph Ch 2 providing an oscillogram as shown at Ch 2 in FIG. 5.

In a preferred embodiment, when an electric field intensity providing the above-mentioned minimum value $\tau_{min}$ is defined as $E_1$ (about 20 volts/1.5 micron for the liquid crystal A described hereinafter) and a maximum pulse duration $\Delta T$ in a data signal pulse train is set to below the minimum value $\tau_{min}$, a voltage providing an electric field intensity E exceeding the electric field intensity $E_1$ may be applied to a half-selected point on a writing line to prevent the occurrence of crosstalk. This is presumably because, at such a half-selected point, a high-frequency AC is applied to cause a $\Delta\epsilon$-coupling due to a dielectric anisotropy, so that the application of the voltage providing an electric field intensity exceeding $E_1$ suppresses the inversion of molecular orientation or the molecular fluctuation of the liquid crystal. Accordingly, in a preferred embodiment of the present invention, the electric field intensity applied at a half-selected point may be set to satisfy the following formula (3):

$$E_0 > E_1 \quad (3),$$

wherein $E_1$ denotes an electric field intensity (V/m or V/μm) corresponding to the minimum value $\tau_{min}$; $E_0$ (=V/d) denotes an electric field intensity at a half-selected point; V (volts) denotes a voltage applied at the half-selected point; end d (m or μm) denotes a spacing between a pair of opposite electrodes.

Further, the present invention may be applicable to a static drive using a common signal and a data signal pulse train in addition to the above-mentioned multiplexing drive using a scanning selection signal and a data pulse train.

Figure 8:
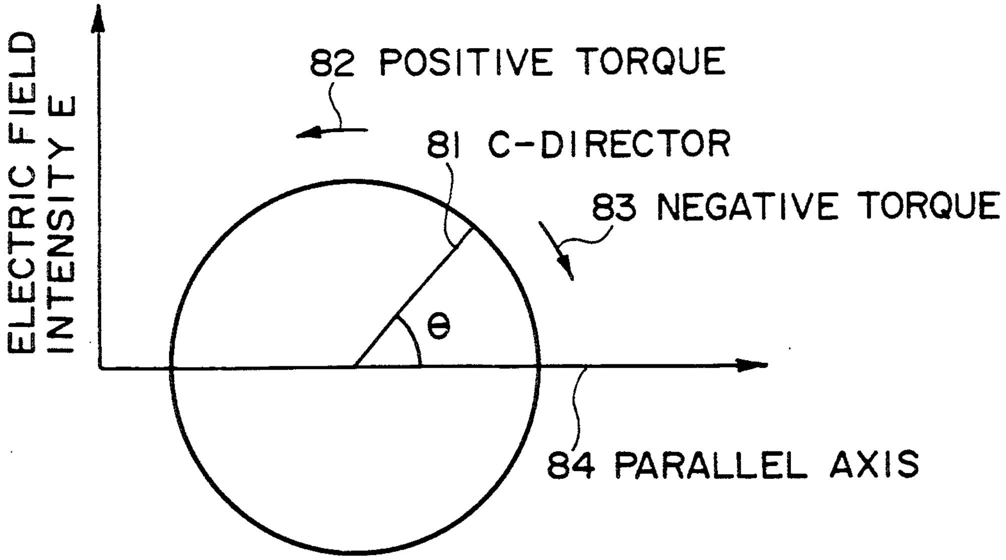
FIG. 8 is an illustration of an angle $\theta$ formed by a C-director.

FIG. 8 illustrates an angle θ of a C-director 81 with respect to an axis 84 in parallel with a substrate (hereinafter referred to as "C-director angle θ"). The C-director represents a projection of a liquid crystal molecule long axis on a vertical molecular layer comprising a plurality of chiral smectic liquid crystal molecules. Further, a direction increasing the C-director angle θ is represented by a positive torque 82, and a direction decreasing the C-director angle θ is represented by a negative torque 83.

Figure 9:
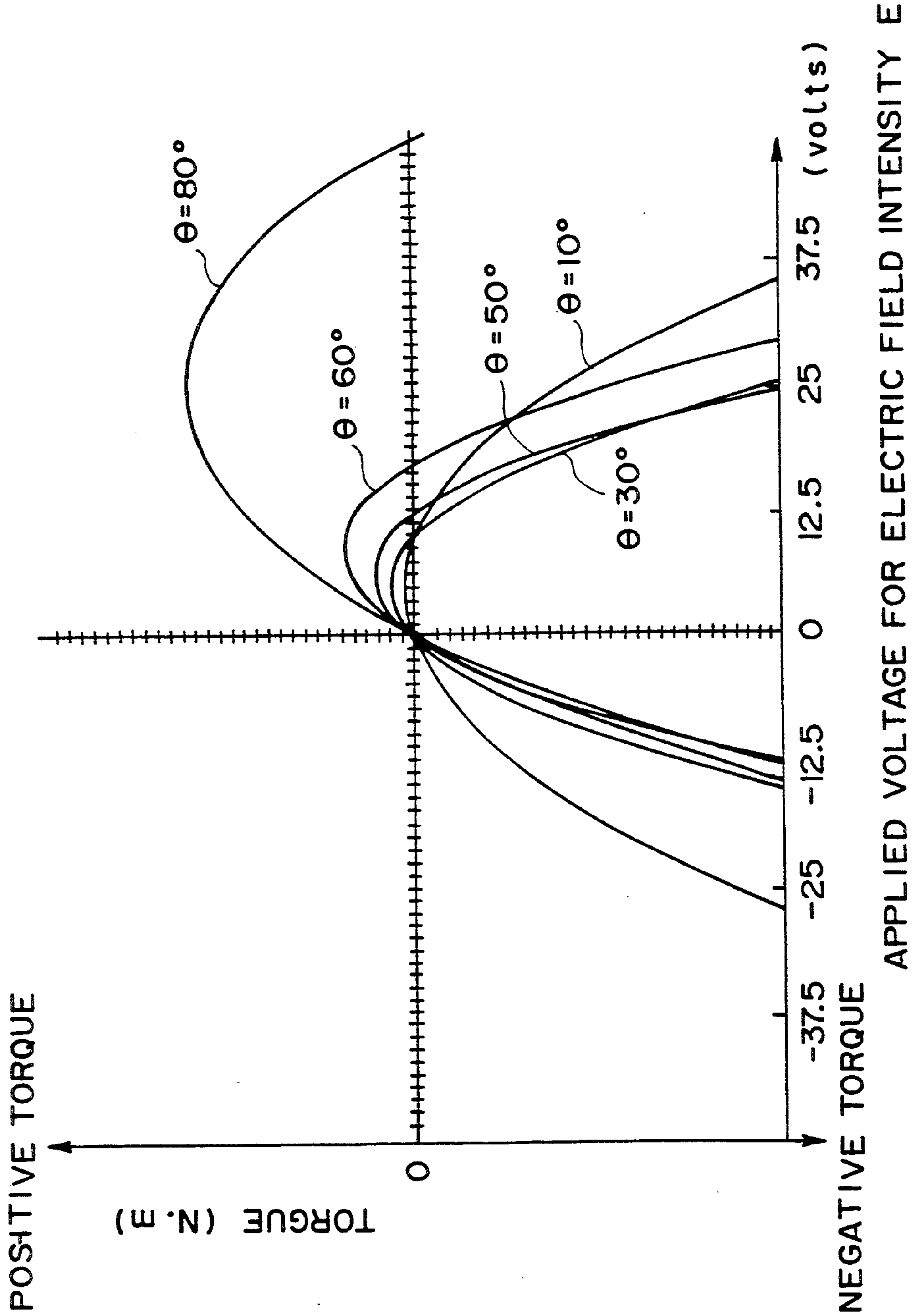
FIG. 9 is a characteristic diagram showing a relationship between a torque and an applied voltage with the angles of C-director as parameters.

FIG. 9 shows a relationship between the applied voltage (for a thickness of 1.5 micron) and the torque with C-director angles θ as parameters.

FIG. 8 shows that a larger positive torque 82 is liable to cause an inversion switching, and a large negative torque is liable to suppress the inversion switching. FIG. 9 shows that a smaller C-director angle θ of 50 degrees or less provides a larger negative torque 83 so that the dielectric anisotropy coupling becomes predominant to suppress the inversion switching. On the other hand, in case where the C-director angle θ is 60 degrees, an applied voltage of about 10 volts provides a maximum positive torque, so that an inversion switching is caused even at a relatively low applied voltage of about 10 volts, for a cell gap of 1.5 micron. Further, in case where the C-director angle is increased up to 80 degrees, the readiness of the inversion is further increased.

Accordingly, in &he present invention, an increase in driving voltage margin may be attained by applying first a low-waveheight pulse and then a high-waveheight pulse for causing an inversion switching to a ferroelectric liquid crystal placed in such an alignment state as to be formed under application of an alternating voltage causing a dielectric anisotropy coupling (i.e., an alignment state set to provide a small C-director angle). Further, in a preferred embodiment of the present invention, a half-selected point at the intersection of a selected scanning electrode and a non-selected data electrode may be supplied with first a high waveheight pulse and then with a low-waveheight pulse to effectively prevent the inversion switching.

In order to cause an alignment state providing a small C-director angle θ, there may be applied a method of applying an AC voltage of a high frequency, e.g., above a relaxation frequency, to non-selected pixels under driving (Japanese Laid-Open Patent Applications Nos. 246722/1986, 246723/1986, 246724/1986, 249024/1986 and 249025/1986, U.S. Pat. No. 4668051, etc.), or a method of applying a high frequency AC prior to driving (Japanese Laid-Open Patent Applications Nos. 220930/1987 and 223729/1987).

Figure 10:
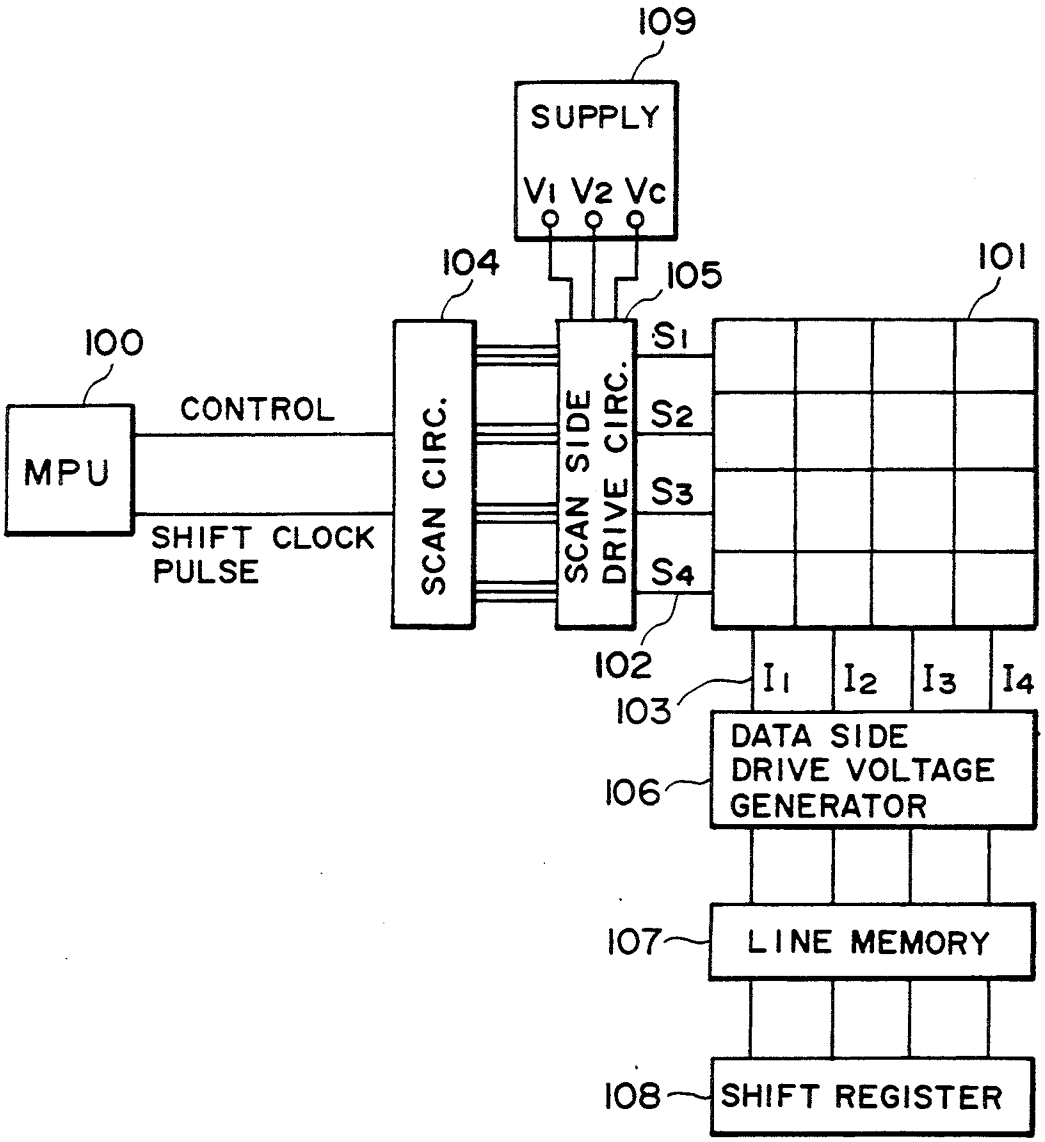
FIG. 10 is a block diagram of an apparatus of the present invention.

FIG. 10 illustrates a driving apparatus for a ferroelectric liquid crystal panel 101 comprising a matrix electrode arrangement used in the present invention. Referring to FIG. 10, the panel comprises scanning lines 102 and data lines 103 intersecting each other, and a ferroelectric liquid crystal (not shown) is interposed between the scanning line and the data lines so as to form a pixel at each intersection. The driving apparatus further includes a scanning circuit 104, a scanning side drive circuit 105, a data side drive voltage generating circuit 106, a line memory 107, a shift register 108, a scanning side drive voltage generating power supply 109, and a microprocessor unit (MPU) 100. The scanning side drive voltage generating power supply 109 is provided with voltages $V_1$, $V_2$ and $V_C$, of which the voltages $V_1$ and $V_2$ may be used as sources of the above-mentioned scanning selection signal and the voltage $V_C$ may be used as a source of a scanning non-selection signal.

Next, the present invention will be explained based on examples.

EXAMPLE

A glass substrate having thereon ITO (indiumtin-oxide) film stripes as transparent electrodes was coated with a 1000 Å A-thick $SiO_2$ film by sputtering and further with a 500 Å A-thick polyimide film by using a polyamic acid solution ("SP-710" (trade name) available from Toray K.K.). The polyimide film was treated by rubbing with acetate fiber-planted cloth.

Two of the thus rubbing-treated glass substrates were provided. On one of the glass substrates, silica beads having an average particle size of 1.5 micron was disposed to provide a cell gap of about 1.5 micron, and the other glass substrate was superposed and bonded thereto so that their stripe electrodes intersected each other and their rubbing axes were in parallel with each other.

Two blank cell were prepared in the above described manner and were filled with chiral smectic liquid crystals A and B, respectively, having the following characteristics:

| Liquid Crystal A (at 25° C.) | |
|---|---|
| Spontaneous polarization Ps: | 12.9 nC/cm$^2$ |
| τmin: | 110 μsec (at 20 V) |
| Δε: | −5.8 |
| Apex angle (H) in a helical structure: | 23 degrees |
| Threshold pulse duration by 18 V rectangular pulse: | 120 μsec |
| Phase transition series: Iso. → Ch → SmA → SmC | |

wherein Iso denotes isotropic phase; Ch, cholesteric phase; SmA, smectic A phase; and SmC , chiral smectic C phase.

| Liquid Crystal B (at 25° C.) | |
|---|---|
| Spontaneous polarization Ps: | 6.6 nC/cm$^2$ |
| τmin: | none |
| Δε: | −0.1 |
| Apex angle (H) in a helical structure: | 23 degrees |
| Threshold pulse duration by 18 V rectangular pulse: | 50 μsec |
| Phase transition series: Iso. → Ch → SmA → SmC | |

Figure 11A:
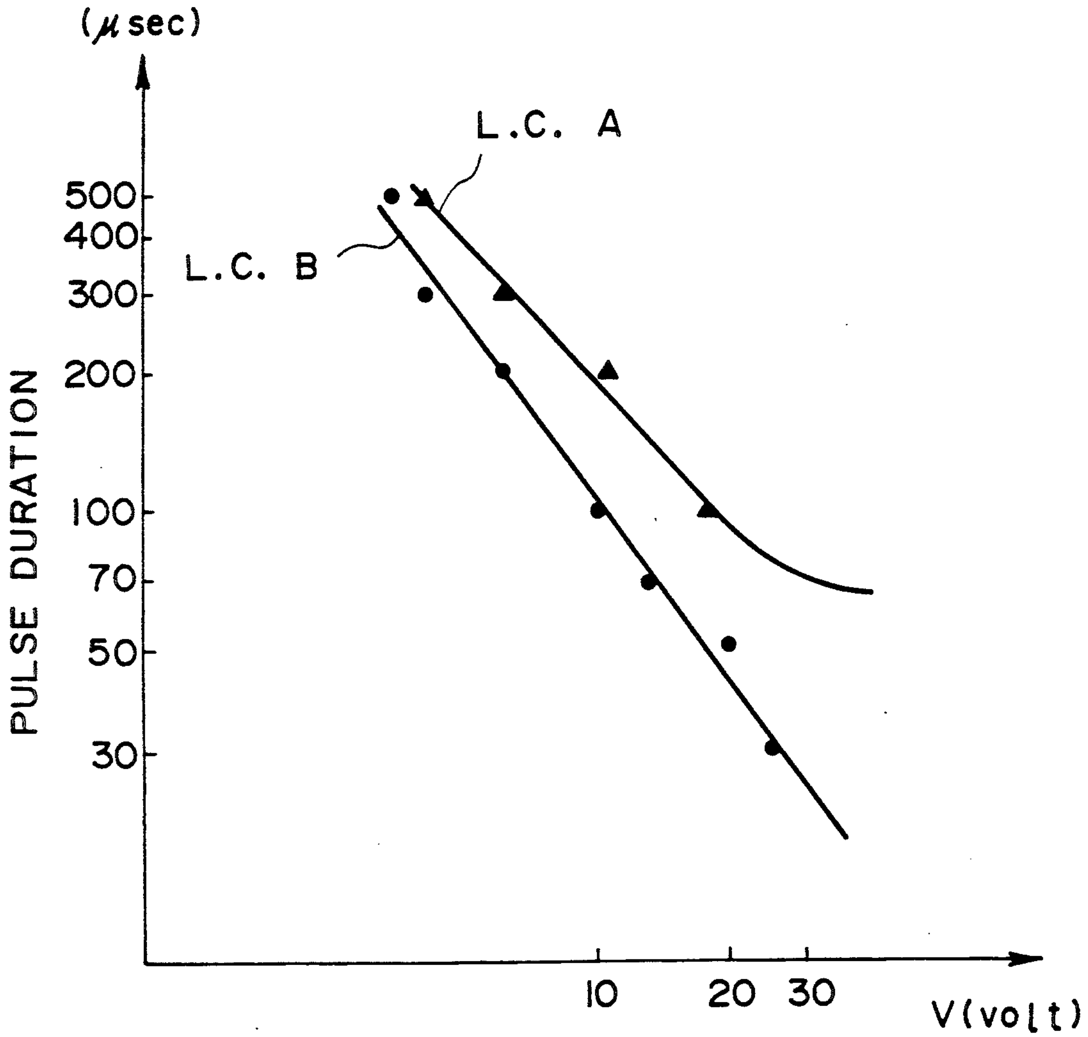
FIG. 11A and 11B are graphs showing threshold characteristics of ferroelectric liquid crystal cells used in the present invention.
Figure 11B:
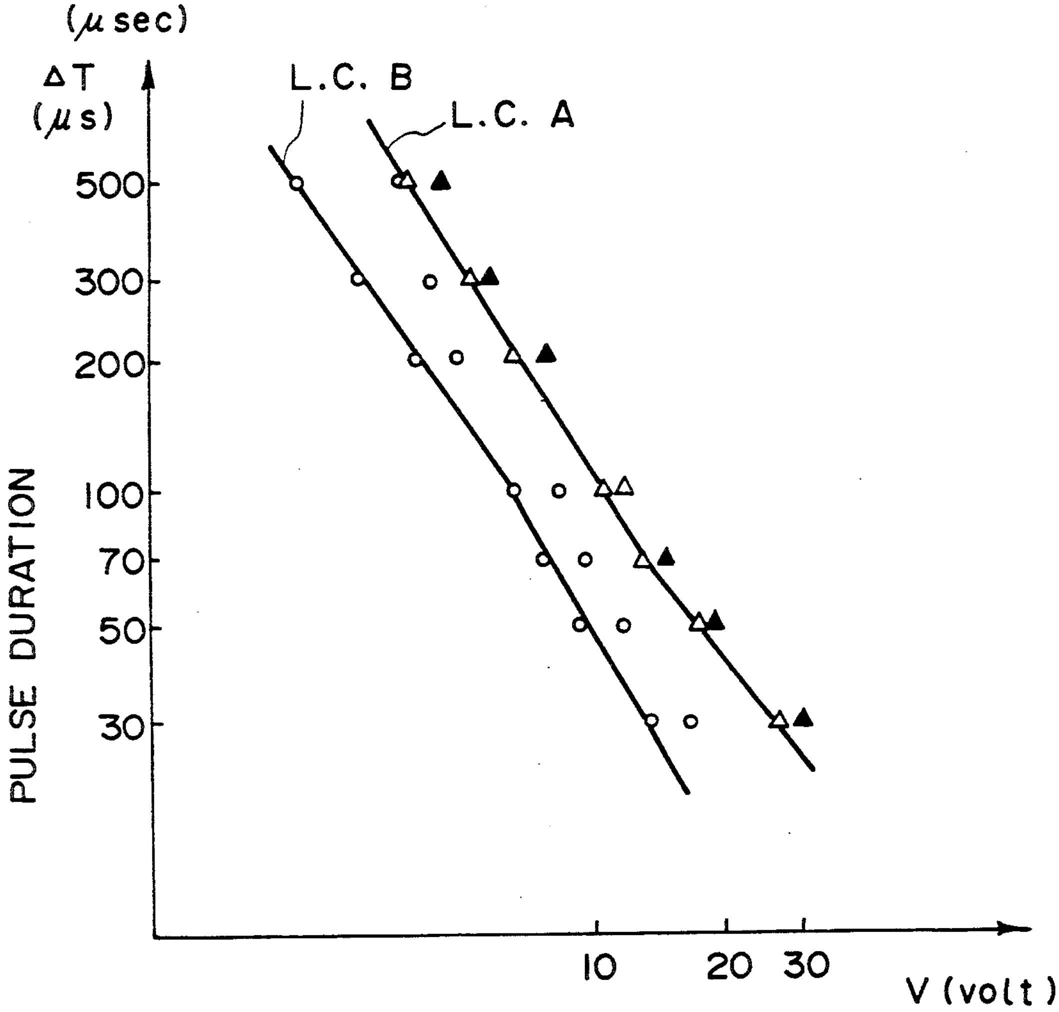

The threshold characteristics of the liquid crystals A and B are shown in FIGS. 11A and 11B wherein Δ and o denote the threshold voltage values, and and denote the saturation voltage values. FIG. 11A shows the characteristics obtained under application of a bipolar pulse of V and −V, while FIG. 11B shows the characteristics obtained under application of a unipolar pulse of V.

Then, the above-prepared two devices were driven by applying a set of driving waveforms shown in FIG. 3 under the following set of conditions A, whereby the device containing the liquid crystal A provided a display image of a high contrast but the device containing the liquid crystal B provided a dark display image of a low contrast.

| Condition A |
| --- |
| $\Delta T_1 = 30$ μsec, $\Delta T_2 = 60$ μsec,<br>$\Delta T_3 = 30$ μsec,<br>$\lvert \pm 17V \rvert < \lvert \pm(V_1 + V_3) \rvert < \lvert \pm 31V \rvert$<br>$V_1 = V_2$<br>Bias ratio $(= \lvert \pm V_3 \rvert / \lvert (V_1 + V_2) \rvert) = \frac{1}{3}$ (constant). |

Further, the devices were driven by applying a set of driving waveforms shown in FIG. 2 under the following set of conditions B, whereby the device containing the liquid crystal A provided a display image of a high contrast but the device containing the liquid crystal B provided a dark display image of a low contrast.

| Condition B |
| --- |
| $V_1 = 14V$, $V_2 = 10V$,<br>$V_3 = 14V$, $V_4 = 10V$,<br>36 μsec $\leqq \Delta T \leqq$ 54 μsec. |

Further, the two devices were driven by applying a set of driving waveforms shown in FIG. 4 under the following sets of conditions C and D, respectively, whereby the device containing the liquid crystal A provided display images of a high contrast but the device containing the liquid crystal B provided dark display images of a low contrast.

| Condition C |
| --- |
| $V_1 = 16V$, $V_2 = 16V$,<br>$V_3 = 8V$,<br>52 μsec $\leqq \Delta T_2 \leqq$ 92 μsec. |
| **Condition D** |
| $V_1 = 16V$, $V_2 = 16V$,<br>$V_3 = 8V$<br>112 μsec $\leqq \Delta T_2 \leqq$ 132 μsec. |

With respect to the device containing the liquid crystal A, the conversion of an optical state was caused by application of a former pulse A and not caused by application of a latter pulse B under the conditions C. On the other hand, during the driving under the conditions D, the conversion of an optical state was caused not by application of a former pulse A but by application of a latter pulse B.

According to the present invention, it is further possible to control a DC bias component to an arbitrary level, preferably to zero. Further, according to the present invention, a display of a high contrast can be realized free of crosstalk.

What is claimed is:

1. In an improved liquid crystal apparatus of the type comprising:

a liquid crystal device comprising a matrix electrode structure including scanning electrodes and data electrodes intersecting each other and forming a pixel at each intersection, and a ferroelectric liquid crystal disposed between the scanning electrodes and the data electrodes, said ferroelectric liquid crystal showing either a first or a second optical state at each pixel depending on a polarity of voltage applied thereto; and means for applying to a pixel on a selected scanning electrode a bipolar pulse for causing a conversion from one to the other of the first and second optical states at the pixel, the improvement wherein;

said ferroelectric liquid crystal has a negative dielectric anisotropy and shows a minimum value of $\tau_{min}$ of a current response time $\tau_0$, and said bipolar pulse includes a unit pulse of one polarity which has a duration set to be shorter than the minimum value $\tau_{min}$.

2. An apparatus according to claim 1, wherein said unit pulse having a duration shorter than the minimum value $\tau_{min}$ has a wavelight providing an electric field intensity higher than an electric field intensity $E_1$ giving the minimum value $\tau_{min}$ of the current response time $\tau_0$.

3. An apparatus according to claim 1, wherein said unit pulse having a duration shorter than the minimum value $\tau_{min}$ is disposed in a former half of the bipolar data pulse.

4. An apparatus according to claim 1, wherein said unit pulse having a duration shorter than the minimum value $\tau_{min}$ is disposed in a latter half of the bipolar data pulse.

5. An apparatus according to claim 1, wherein said ferroelectric liquid crystal is a chiral smectic liquid crystal.

6. In an improved liquid crystal apparatus of the type comprising:

a liquid crystal device comprising a matrix electrode structure including scanning electrodes and data electrodes intersecting each other and forming a pixel at each intersection, and a ferroelectric liquid crystal disposed between the scanning electrodes and the data electrodes, and showing either a first or a second optical state at each pixel depending on a polarity of voltage applied thereto; and means for applying to non-selected pixels an AC voltage not causing a conversion between the first and second optical states at the non-selected pixels and applying to a pixel on a selected scanning electrode a bipolar pulse for causing a conversion from one to the other of the first and second optical states at the pixel, the improvement wherein;

said ferroelectric liquid crystal has a negative dielectric anisotropy and shows a minimum value of $\tau_{min}$ of a current response time $\tau_0$, and said bipolar pulse includes a unit pulse of one polarity which has a duration set to be shorter than the minimum value $\tau_{min}$.

7. An apparatus according to claim 6, wherein said unit pulse having a duration shorter than the minimum value $\tau_{min}$ has a waveheight providing an electric field intensity higher than an electric field intensity $E_1$ giving the minimum value $\rho_{min}$ of the current response time $\tau_0$.

8. An apparatus according to claim 6, wherein said unit pulse having a duration shorter than the minimum value $\tau_{min}$ is disposed in a former half of the bipolar data pulse.

9. An apparatus according to claim 6, wherein said unit pulse having a duration shorter than the minimum value $\tau_{min}$ is disposed in a latter half of the bipolar data pulse.

10. An apparatus according to claim 6, wherein said ferroelectric liquid crystal is a chiral smectic liquid crystal.

11. In an improved liquid crystal apparatus of the type comprising:

providing a liquid crystal device comprising a matrix electrode structure including scanning electrodes and data electrodes intersecting each other and forming a pixel at each intersection, and a ferroelectric liquid crystal disposed between the scanning electrodes and the data electrodes, and showing either a first or a second optical state at each pixel depending on a polarity of voltage applied thereto; and applying to a pixel on a selected scanning electrode a bipolar pulse for causing a conversion from one to the other of the first and second optical states at the pixel, the improvement wherein;

said ferroelectric liquid crystal has a negative dielectric anisotropy and shows a minimum value of $\tau_{min}$ of a current response time $\tau_0$, and said bipolar pulse includes a unit pulse of one polarity which has a duration set to be shorter than the minimum value $\tau_{min}$.

12. An apparatus according to claim 11, wherein said unit pulse having a duration shorter than the minimum value $\tau_{min}$ has a waveheight providing an electric field intensity higher than an electric field intensity $E_1$ giving the minimum value $\rho_{min}$ of the current response time $\tau_0$.

13. An apparatus according to claim 11, wherein said unit pulse having a duration shorter than the minimum value $\tau_{min}$ is disposed in a former half of the bipolar data pulse.

14. An apparatus according to claim 11, wherein said unit pulse having a duration shorter than the minimum value $\tau_{min}$ is disposed in a latter half of the bipolar data pulse.

15. An apparatus according to claim 11, wherein said ferroelectric liquid crystal is a chiral smectic liquid crystal.

16. In an improved liquid crystal apparatus of the type comprising:

providing a liquid crystal device comprising a matrix electrode structure including scanning electrodes and data electrodes intersecting each other and forming a pixel at each intersection, and a ferroelectric liquid crystal disposed between the scanning electrodes and the data electrodes, and showing either a first or a second optical state at each pixel depending on a polarity of voltage applied thereto;

applying to non-selected pixels an AC voltage not causing a conversion between the first and second optical states at the non-selected pixels, and applying to a pixel on a selected scanning electrode a bipolar pulse for causing a conversion from one to the other of the first and second optical states at the pixel, the improvement wherein:

said ferroelectric liquid crystal has a negative dielectric anisotropy and shows a minimum value of $\tau_{min}$ of a current response time $\tau_0$, and said bipolar pulse includes a unit pulse of one polarity which has a duration set to be shorter than the minimum value $\tau_{min}$.

17. An apparatus according to claim 16, wherein said unit pulse having a duration shorter than the minimum value $\tau_{min}$ has a waveheight providing an electric field intensity higher than an electric field intensity $E_1$ giving the minimum value $\rho_{min}$ of the current response time $\tau_0$.

18. A method according to claim 16, wherein said unit pulse having a duration shorter than the minimum value $\tau_{min}$ is disposed in a former half of the bipolar data pulse.

19. A method according to claim 16, wherein said unit pulse having a duration shorter than the minimum value $\tau_{min}$ is disposed in a latter half of the bipolar data pulse.

20. A method according to claim 16, wherein said ferroelectric liquid crystal is a chiral smectic liquid crystal.

* * * * *

UNITED STATES PATENT AND TRADEMARK OFFICE

CERTIFICATE OF CORRECTION

PATENT NO. : 5,136,408

DATED : August 4, 1992

INVENTOR(S) : SHINJIRO OKADA, ET AL.

It is certified that error appears in the above-identified patent and that said Letters Patent is hereby corrected as shown below:

<u>SHEET 8 OF 11</u>

FIG. 9, "TORGUE" should read --TORQUE--.

<u>COLUMN 4</u>

Line 54, "intensity E" should read --intensity $E_0$--.

<u>COLUMN 6</u>

Line 65, "and and" should read --and ▲ and ●--.

<u>COLUMN 8</u>

Line 8, "wherein;" should read --wherein:--.
Line 49, "wherein;" should read --wherein:--.
Line 60, "minimum value $\rho_{min}$" should read -- --minimum value $\tau_{min}$--.

<u>COLUMN 9</u>

Line 4, "liquid crystal apparatus" should read --driving method--.
Line 18, "wherein;" should read --wherein:--.
Line 20, "of" should be deleted.
Line 25, "An apparatus" should read --A method--.
Line 30, ""minimum value $\rho_{min}$" should read -- --minimum value $\tau_{min}$--.
Line 31, "An apparatus" should read --A method--.
Line 35, "An apparatus" should read --A method--.
Line 39, "An apparatus" should read --A method--.

UNITED STATES PATENT AND TRADEMARK OFFICE

CERTIFICATE OF CORRECTION

PATENT NO. : 5,136,408
DATED : August 4, 1992
INVENTOR(S) : SHINJIRO OKADA, ET AL.

It is certified that error appears in the above-identified patent and that said Letters Patent is hereby corrected as shown below:

COLUMN 10

Line 1, "liquid crystal apparatus" should read --driving method--.
Line 14, "pixels," should read --pixels;--.
Line 25, "An apparatus" should read --A method--.
Line 29, "minimum value $\rho_{min}$" should read --minimum value $\tau_{min}$--.

Signed and Sealed this

Twenty-sixth Day of October, 1993

Attest:

BRUCE LEHMAN

Attesting Officer

Commissioner of Patents and Trademarks